Jan. 2, 1951          H. C. MILLER          2,536,611
EXPANSION JOINTS SEALED WITH A COMPOSITION CONTAINING
COAL TAR PITCH, RUBBERY BUTADIENE-ACRYLONITRILE
COPOLYMER AND POLYMERIZED VEGETABLE OIL
Filed July 20, 1949
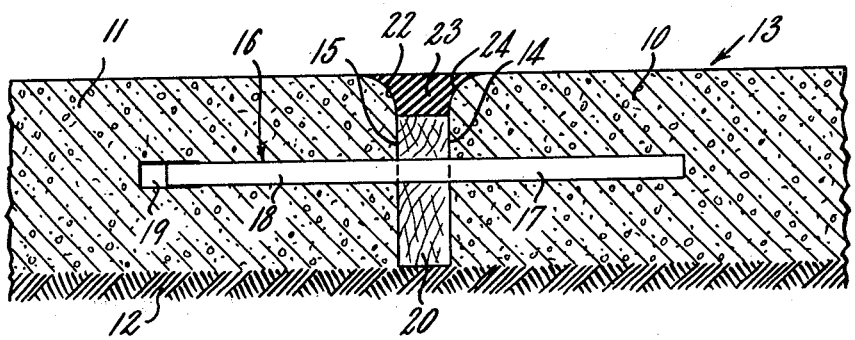
INVENTOR.
HERMAN C. MILLER
BY Henry M. Leigh
ATTORNEY Patented Jan. 2, 1951

2,536,611

UNITED STATES PATENT OFFICE 2,536,611

EXPANSION JOINTS SEALED WITH A COMPOSITION CONTAINING COAL TAR PITCH, RUBBERY BUTADIENE - ACRYLONITRILE COPOLYMER AND POLYMERIZED VEGETABLE OIL

Herman C. Miller, Waterbury, Conn., assignor to United States Rubber Company, New York, N. Y., a corporation of New Jersey Application July 20, 1949, Serial No. 105,849

8 Claims. (Cl. 94—18)

This invention relates to thermoplastic compositions for sealing joint sections in concrete pavements, and particularly to hot-melting type compositions for expansion joint sealers, and contraction or dummy joint sealers, in fueling and warm-up areas, and in take-off areas, for jet planes in airfields.

When starting jet planes and during the warm-up, a large amount of the jet fuel is spilled over the apron or other warm-up area, and likewise a large amount of fuel is spilled in going down the taxi strip or other take-off area. This fuel spillage deteriorates conventional expansion joint compositions, such as asphalt and natural rubber or GR-S synthetic rubber (copolymer of major proportion of butadiene-1,3 and a minor proportion of styrene) compositions. Tars are highly resistant to jet fuels but are unsatisfactory as joint sealers because they do not have the required flexibility. The compositions of the present invention are highly resistant to jet fuels, and also provide the required high degree of distendability, compressibility, recuperative power, solvent resistance, water resistance, adhesiveness and ability to maintain a bond at sub-freezing temperatures for joint sealing compositions for expansion joints and for contraction or dummy joints. The compositions are also useful as joint sealers in conventional paving constructions, such as highways and airports, for use in weather-proofing the spaces left between constituent members of masonry structures for the expansion and contraction of such members under changing atmospheric conditions. The compositions may also be used for road surfacing.

I have discovered that compositions comprising coal tar pitch, butadiene-acrylonitrile type synthetic rubber and polymerized vegetable oil have the necessary properties to make excellent joint fillers for expansion joints, and for contraction or dummy joints, and at the same time have a high solvent resistance and high resistance by deterioration to liquid fuels for jet planes.

The coal tar pitch used in the composition of the present invention may have a melting point or so-called softening point in the range 90° F. to 160° F., preferably in the range 110° F. to 120° F. The butadiene-acrylonitrile type synthetic rubber is a copolymer of a major proportion (51 to 80 parts by weight) of butadiene-1,3 and a minor proportion (correspondingly 49 to 20 parts by weight) of acrylonitrile (or the equivalent methacrylonitrile). The butadiene-acrylonitrile synthetic rubber is a commercial material having the government synthetic rubber designation of GR-A, and is also sold as Perbunan. The butadiene-acrylonitrile synthetic rubber may be used in the compositions of the present invention as prepared, or in the form of reclaimed synthetic rubber when available. The polymerized vegetable oil may be polymerized castor oil, polymerized linseed oil or polymerized rape seed oil, or mixtures of the same. Polymerized castor oil is the present preferred polymerized vegetable oil. Polymerized castor oil is the gummy material resulting from air blowing castor oil, and may also be prepared by heat polymerizing castor oil in known manner. It is generally a reddish-amber colored, elastic, tacky gel. The compositions used in the present invention comprise 70 to 85% of the coal tar pitch, 12 to 18% of the butadiene-acrylonitrile synthetic rubber (crude or reclaim) and 2 to 8% of the polymerized vegetable oil. All percentages and parts referred to herein are by weight. Because of variations in coal tar pitches, the melting point of the final product may be too high for some applications, in which case a small amount, e. g. up to 10% of the final product of a hydrocarbon oil will give a lower melting product. Hydrocarbon oils which may be used may be those having an initial boiling point above 300° C., e. g. petroleum distillates, such as light, medium and heavy lubricating oils, transformer oil, coal tar oil, light mineral oil, etc. It is preferred, however, not to include such hydrocarbon oils since they reduce the solvent resistance of the final composition.

As an example of a composition according to the present invention and its method of preparation, 100 parts of a butadiene-acrylonitrile synthetic rubber comprising a copolymer of 65 parts of butadiene-1,3 and 35 parts of acrylonitrile were broken down on a rubber mill to facilitate handling and reduce the mixer schedule time. The thus treated synthetic rubber was transferred to an internal mixer of the Werner and Pfleiderer type. If desired, the synthetic rubber could have been broken down originally in the Werner and Pfleiderer mixer. Where a mill-refined butadiene-acrylonitrile synthetic rubber reclaim is used, it is introduced initially into the mixer. A coal tar pitch of melting point 110° F. to 120° F. was heated to an easy pouring condition between 175° F. and 212° F. 500 parts of this pitch was slowly added, allowing the batch to pull in and become smooth after each addition of the pitch. There was also slowly added 30 parts of an air blown castor oil which was a reddish-amber colored, elastic, tacky gel with a specific gravity of 1.025. The batch was heated by applying steam to the jacket of the mixer toward the end of the mixing operation. The polymerized (air blown) castor oil may be replaced by other polymerized vegetable oils which may be prepared by heating, air blowing, boiling or cracking vegetable oils, such as castor oil, linseed oil and rape seed oils to form a gummy, semi-solid, elastic polymerized residue. The relative quantities of the several ingredients may be varied considerably within the ranges set out heretofore to produce variations in physical properties such as, flow-point, plasticity, flexibility at low temperatures, and viscosity of the molten compound at high temperature, to better accommodate the available methods of installation or to better meet the physical requirements for a wide variety of applications. The particular composition exemplified immediately above is excellent as a joint sealer for expansion and contraction joints in airfields where jet planes are in operation.

The above composition as applied to an expansion joint is illustrated in the drawing which is a section of one form of a transverse expansion joint. In the drawing, concrete sections 10 and 11 are shown on a conventional pavement bed 12, the top surface 13 of the concrete sections being the road surface on which the wheels of the planes or other vehicles ride. When the concrete sections are poured, an expansion space is left between the adjacent faces 14 and 15 of the sections and an expansion joint assembly is embedded in the concrete sections. The expansion joint assembly comprises a number of longitudinal metal dowel bars 16 extending to the desired length on either side of the expansion space at the desired intervals across the width of the sections intermediate the bed 12 and the surface 13. The portions 17 of the dowel bars extending into the concrete section 10 are fixed in the concrete section 10 and the portions 18 of the dowel bars extending into the concrete section 11 are slidable in the concrete section 11 and terminate in sliding relation to metal sleeves 19 embedded in the concrete section 11. The lower part of the expansion space between the faces 14 and 15 is filled with a conventional preformed expansion joint filler such as wood board, or fiber strip 20, leaving an open space the required distance down from the top surface 13 for the joint sealer, such as the thermoplastic composition of the present invention. The top edges of the faces 14 and 15 of the expansion joint are tooled or rounded at 21 and 22. The sealing composition of the present invention is melted and poured into the top of the expansion space and allowed to cool and harden as at 23. The poured composition of a formulation as above described, adheres on cooling to the faces 14 and 15 of the paving slabs. The composition has the ability to maintain its adhesiveness and bond to the concrete at high atmospheric temperatures and at sub-freezing temperatures and to retain at these temperatures a high degree of distendability, compressibility and recuperative power, so that a successful water-stop is maintained throughout the seasonal changes which expand and contract the concrete paving slabs. The expansion joint construction described is merely one form of conventional expansion joint construction, and except for the joint sealing composition forms no part of the present invention. Contraction or dummy joints are similar to the expansion joint shown in the drawing except that the concrete paving sections are closer together and may abut, and there would generally be no sleeves embedded in the concrete for the ends of the sliding part of the dowel bars, or the dowel bars may be omitted altogether. The drawing is merely illustrative of the use of the composition of the present invention as a joint sealer in paving. The composition of the present invention may also be used in spaces between the faces of other constructional members, as in bridge or other structural work, or as a road surfacing composition.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In a paving construction, the combination of a pair of adjacent paving sections, and a joint sealing composition between said sections comprising 70% to 85% by weight of coal tar pitch having a melting point in the range 90° F. to 160° F., 12% to 18% by weight of a synthetic rubber copolymer of a major proportion of butadiene-1,3 and a minor proportion of acrylonitrile, and 2% to 8% of polymerized vegetable oil.

2. In a paving construction, the combination of a pair of adjacent paving sections, and a joint sealing composition between said sections comprising 70% to 85% by weight of coal tar pitch having a melting point in the range 110° F. to 120° F., 12% to 18% by weight of a synthetic rubber copolymer of a major proportion of butadiene-1 3 and a minor proportion of acrylonitrile, and 2% to 8% of polymerized vegetable oil.

3. In a paving construction, the combination of a pair of adjacent paving sections, and a joint sealing composition between said sections comprising 70% to 85% by weight of coal tar pitch having a melting point in the range 90° F. to 160° F., 12% to 18% by weight of a synthetic rubber copolymer of a major proportion of butadiene-1,3 and a minor proportion of acrylonitrile, and 2% to 8% of polymerized castor oil.

4. In a paving construction, the combination of a pair of adjacent paving sections, and a joint sealing composition between said sections comprising 70% to 85% by weight of coal tar pitch having a melting point in the range 110° F. to 120° F., 12% to 18% by weight of a synthetic rubber copolymer of a major proportion of butadiene-1,3 and a minor proportion of acrylonitrile, and 2% to 8% of polymerized castor oil.

5. A thermoplastic composition comprising 70% to 85% by weight of coal tar pitch having a melting point in the range 90° F. to 160° F., 12% to 18% by weight of a synthetic rubber copolymer of a major proportion of butadiene-1,3 and a minor proportion of acrylonitrile, and 2% to 8% of polymerized vegetable oil.

6. A thermoplastic composition comprising 70% to 85% by weight of coal tar pitch having a melting point in the range 110° F. to 120° F., 12% to 18% by weight of a synthetic rubber copolymer of a major proportion of butadiene-1,3 and a minor proportion of acrylonitrile, and 2% to 8% of polymerized vegetable oil.

7. A thermoplastic composition comprising 70% to 85% by weight of coal tar pitch having a melting point in the range 90° F. to 160° F., 12% to 18% by weight of a synthetic rubber copolymer of a major proportion of butadiene-1,3 and a minor proportion of acrylonitrile, and 2% to 8% of polymerized castor oil.

8. A thermoplastic composition comprising 70% to 85% by weight of coal tar pitch having a melting point in the range 110° F. to 120° F., 12% to 18% by weight of a synthetic rubber copolymer of a major proportion of butadiene-1,3 and a minor proportion of acrylonitrile, and 2% to 8% of polymerized castor oil.

HERMAN C. MILLER.

REFERENCES CITED

The following references are of record in the file of this patent:

UNITED STATES PATENTS

| Number | Name | Date |
|---|---|---|
| 2,334,184 | Fisher | Nov. 16, 1943 |

OTHER REFERENCES

"Asphalts and Allied Substances," by Abraham, 4th ed., pages 104 and 368.

"Synthetic Resins and Rubbers," by Powers, Wiley & Sons, 1943; p. 213.